United States Patent [19]
Chapman

[11] 3,929,925
[45] Dec. 30, 1975

[54] RECOVERY OF A PROPANE-ETHANE PRODUCT AND RECYCLE OF PROPANE IN HF ALKYLATION

[75] Inventor: Charles Chapman, Bartlesville, Okla.

[73] Assignee: Phillips Petroleum Company, Bartlesville, Okla.

[22] Filed: June 7, 1974

[21] Appl. No.: 477,179

[52] U.S. Cl. .................................. 260/683.48
[51] Int. Cl.[2] ............................... C07C 3/54
[58] Field of Search...... 260/683.48, 683.42, 683.43

[56] References Cited
UNITED STATES PATENTS

| | | | |
|---|---|---|---|
| 2,350,448 | 6/1944 | Collins .......................... | 260/683.48 |
| 3,723,565 | 3/1973 | Henderson ..................... | 260/683.43 |
| 3,763,265 | 10/1973 | Hutson, Jr. et al. ........... | 260/683.48 |
| 3,767,726 | 10/1973 | Hutson, Jr. et al. ........... | 260/683.48 |
| 3,804,918 | 4/1974 | Henderson ..................... | 260/683.48 |

Primary Examiner—Herbert Levine
Assistant Examiner—G. J. Crasanakis

[57] ABSTRACT

An isoparaffin-olefin alkylation reaction product obtained using HF as a catalyst is fractionated to produce an overhead containing propane, ethane and HF, the overhead is partially condensed to produce liquid HF, liquid hydrocarbon, essentially propane lean in ethane, and a vapor stream rich in ethane, the propane lean in ethane is used to reflux the fractionation producing the overhead, the vapors are condensed forming phases and, upon separation of acid phase, the hydrocarbon phase formed is passed by pump to an HF stripper, overhead from the HF stripper is condensed forming phases, and acid phase is removed and hydrocarbon phase is returned to the stripper as reflux. Bottoms from the HF stripper are propane and ethane and after heating are fractionated to produce ethane-propane yield as product and a propane lean in ethane and lean in corrosive HF suitable for use as pump flush, and for increasing the ethane removal ability of the stripper by return thereto.

3 Claims, 1 Drawing Figure

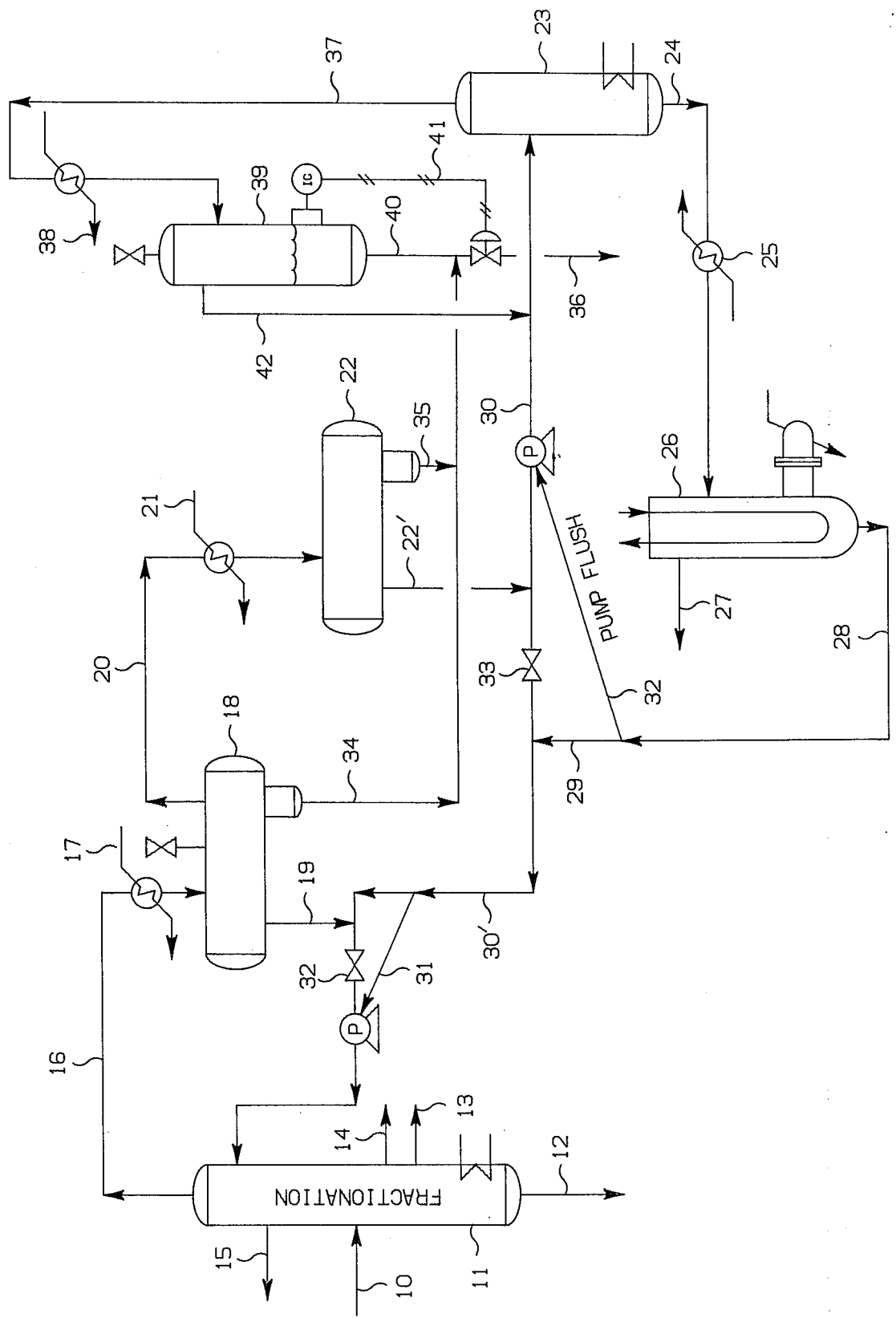

RECOVERY OF A PROPANE-ETHANE PRODUCT AND RECYCLE OF PROPANE IN HF ALKYLATION

This invention relates to alkylation. In one of its aspects it relates to alkylation of isoparaffin with an olefin. In another of its aspects it relates to the working up of the effluents from an HF-catalyzed alkylation of an isoparaffin with an olefin.

In one of its concepts the invention provides a process in which overhead from a depropanizer is partially condensed, resulting in a liquid acid phase which is recovered, a liquid propane phase lean in ethane which is charged as reflux to the depropanizer, and a vapor stream which is condensed and which upon separation from it of liquid acid is passed by a pump to an HF stripper. Overhead from the stripper is cooled and condensed and upon separation of liquid acid phase therefrom the hydrocarbon phase as obtained is returned to the stripper as reflux therefor. Bottoms from the stripper, consisting essentialy of propane and ethane, are heated and fractionated to produce an ethane-propane yield product and a stream of propane lean in ethane and lean in HF. The last-mentioned stream is used as a recycle feed to the stripper as well as flush to the pump.

Currently, greater emphasis must be placed upon conservation of energy and this includes energy not only for the operation of equipment in a plant producing alkylate but also conservation of energy in producing the equipment for that operation. Size of equipment is all the more costly as pressures are elevated and size increases when it is desired to increase throughputs unless some arrangement is conceived whereby equipment size can be maintained the same or even reduced.

I have now conceived a combination of steps for the recovery from an HF catalyzed alklation effluent of a product ethane propane which permits using lower pressures and smaller equipment. Thus in the two-stage removal of acid, as described herein, especially in view of the difference in temperature, i.e., lower temperature applied to the treatment of the vapor resulting from the partial condensation, it is possible to remove to a greater degree acid from the hydrocarbon which then is sent in smaller volume, relatively, to the HF stripper. Because this is accomplished and because of the production, in the manner as described herein, of the propane poor in ethane and lean in HF there is provided (to minimize corrosion) not only a pump flush, which upon intermingling with the liquid being pumped will not enrich the same in ethane, but also an adequate quantity of recycle propane poor in ethane to enhance the ability of the stripper to yield more ethane from the system as LPG product, as will be apparent from a study of this disclosure.

It is an object of this invention to provide a process for the alkylation of an isoparaffin with an olefin in the presence of HF acid. It is another object of this invention to provide energy-saving steps in combination for such an alkylation. It is a further object of this invention to provide for the production of a propane poor in ethane and lean in HF useful for increasing the capacity of an HF stripper to yield ethane from an operation. It is a further object of this invention to provide an improved pump flush for pumps in the operation, which pump flush is lean in corrosive HF.

Other aspects, concepts, objects and several advantages of the invention are apparent from a study of this disclosure, the drawing and the appended claims.

According to the present invention, there is provided a process for the alkylation of an isoparafin with an olefin in the presence of HF catalyst which comprises fractionating in a fractionating zone an alkylation effluent to produce an overhead which contains ethane, propane, and HF, partially condensing said overhead producing a first acid phase which is recovered, a hydrocarbon phase containing propane lean in ethane, and a vapor stream containing HF, ethane, and propane, passing propane lean in ethane to the fractionation zone as reflux therefor, condensing said vapor stream to form a second acid phase which is recovered, and a second hydrocarbon phase which is passed through an HF stripper zone to remove HF therefrom, and in said zone producing a bottoms stream containing essentially ethane and propane, warming said bottoms stream, fractioning said bottoms stream to produce a vaporous product propane-ethane yield stream and a bottoms liquid propane poor in ethane and lean in HF, and passing at least a portion of said bottoms poor in ethane and lean in HF, to said HF stripping zone.

Further, according to the invention there is provided a process, as described, wherein the reflux is passed to the fractionation zone by a pump and wherein said propane lean in ethane and in corrosive HF is used as a flush for said pump.

Still further, according to the invention, the second hydrocarbon phase is passed to said HF stripping zone with a pump and said propane lean in ethane and lean in HF is used as a flush for said last mentioned pump.

Further still, according to the invention there is provided a process as described wherein the overhead from the stripper is condensed, two liquid phases are formed, the acid phase is recovered and the hydrocarbon phase is returned to the stripper zone as reflux therefor.

Referring now to the drawing, hydrocarbon from an alkylation of an isoparaffin, e.g., isobutane and/or isopentane with an olefin which is at least one of ethylene, propylene, a butylene, an amylene, or a hexylene and which has been separated from HF catalyst is passed by 10 to fractionator 11 from which are removed alkylate at 12, normal butane vapor at 13, vaporous isobutane at 14, liquid isobutane recycle at 15, and an overhead vapor 16 containing ethane, propane, organic fluorides, and HF. The stream 16 is partially condensed in partial condenser 17 and forms two liquid phases in accumulator 18. From an accumulator 18 a propane phase lean in ethane is removed at 19 and pumped by the pump as reflux to the top of the fractionation tower. This permits the tower to operate at a lower pressure because ethane is not returned in substantial quantity to the tower. Acid phase formed is separated at 34 and passed from the unit at 36 and can be returned to HF alkylation. Vapor from accumulator 18 is taken at 20 through condenser 21 wherein it is condensed and the condensate accumulated in accumulator 22. A liquid acid phase formed is taken off at 35 and 36 from the unit, and can be returned to alkylation. Hydrocarbon phase rich in ethane is passed by 22' and 30 and by the pump to stripper 23. In stripper 23 there is formed an overhead vapor removed via 37, and which is condensed at 38 and passed to accumulator 39 from which an acid phase formed is taken from the unit via 40 and 36. Hydrocarbon phase is passed by 42 and 30 back to the stripper. From the stripper, bottoms consisting essentially of ethane and propane are taken at 24 through heater 25 and passed to fractionation unit 26 from which an overhead vapor 27 product of ethane-propane is yielded. Bottoms 28 are essentially propane which is lean in HF and lean in ethane. This propane, according to the invention, is an improved pump flush, and is passed by 28 and 32 to the pump as pump flush for this pump supplying the stripper, and by 29 and 30 through valve 33 to the suction of the said pump supplying the stripper, thus increasing the propane content of the feed to the stripper, thus allowing increased removal of ethane out the bottom of the stripper rather than losing ethane via venting (not shown) from accumulator 18 and/or 39. Further, the improved pump flush is passed by 30' and 31 as pump flush to the pump supplying the reflux to the fractionation tower 11. Also importantly, propane lean in ethane and lean in HF is passed by valve 32' to the pump pumping reflux to the fractionation tower.

In Table I there are presented calculated conditions which are Typical and Approximate Ranges for the embodiment just described.

TABLE I

| Calculated Conditions | | |
|---|---|---|
| | TYPICAL | APPROXIMATE RANGES |
| Fractionator 11: | | |
| Top temperature, °F | 130 | 110 – 160 |
| Bottom temperature, °F | 439 | 380 – 500 |
| Pressure, psia | 300 | 250 – 400 |
| Accumulator 18: | | |
| Temperature, °F | 114 | 80 – 130 |
| Pressure, psia | 295 | 240 – 395 |
| Accumulator 22: | | |
| Temperature, °F | 100 | 50 – 175 |
| Pressure, psia | 275 | 220 – 375 |
| HF Stripper 23: | | |
| Top temperature, °F | 122 | 100 – 130 |
| Bottom temperature, °F | 141 | 120 – 150 |
| Pressure, psia | 330 | 280 – 430 |
| Accumulator 39: | | |
| Temperature, °F | 100 | 50 – 175 |
| Pressure, psia | 325 | 275 – 425 |
| Vaporizer 25: | | |
| Hydrocarbon effluent, °F | 142 | 120 – 150 |
| Separator 26: | | |
| Top temperature, °F | 142 | 120 – 150 |

TABLE I-continued

| Calculated Conditions | | |
|---|---|---|
| | TYPICAL | APPROXIMATE RANGES |
| Pressure, psia | 325 | 275 – 425 |

In Table II there are given stream compositions for the principal streams of the embodiment described without and with recycle of the propane poor in ethane through valve 33.

TABLE II

| | Feed 10 | ALKY 12 | nC$_4$ 13 | iC$_4$ 14 | iC$_4$ 15 | Overhead 16 | Liquid 19 | Vapor 20 | Liquid 22 | Total to HF Stripper | Liquid 24 | Vapor Yield 27 | Liquid 28 | Pump Flush (31) | Pump Flush (32) | Liquid via 33 |
|---|---|---|---|---|---|---|---|---|---|---|---|---|---|---|---|---|
| Barrels Per Day without Recycle 33 | | | | | | | | | | | | | | | | |
| Ethane & Lighter | 36 | — | — | 2 | 5 | 216 | 187 | 29 | 29 | 76 | 29 | 29 | .1 | — | — | none |
| Propane | 2147 | — | — | 583 | 873 | 12642 | 11808 | 834 | 834 | 1247 | 977 | 691 | 286 | 143 | 143 | — |
| Isobutane | 20557 | 4 | 18 | 9888 | 10646 | 339 | 334 | 5 | 5 | 9 | 8 | 1 | 7 | 3.5 | 3.5 | — |
| Normal Butane | 4142 | 184 | 299 | 1925 | 1734 | 3 | 3 | — | — | — | — | — | — | — | — | — |
| Alkylate (iC$_5$ plus) | 3685 | 3370 | 25 | 190 | 100 | — | — | — | — | — | — | — | — | — | — | — |
| HF | 195 | — | — | — | — | 265 | 105 | 34 | 6 | 9 | — | — | — | — | — | — |
| Below is with 934 Barrels Per Day C$_3$ Recycle 33 | | | | | | | | | | | | | | | | |
| Ethane & Lighter | 48 | — | — | 3 | 6 | 358 | 319 | 39.5 | 39.5 | 101 | 40 | 39.2 | 1 | .1 | .1 | .6 |
| Propane | 2147 | — | — | 583 | 873 | 12642 | 11808 | 834 | 834 | 2042 | 1625 | 691 | 934 | 143 | 143 | 648 |
| Isobutane | 20557 | 4 | 18 | 9888 | 10646 | 339 | 334 | 5 | 5 | 16 | 14 | 1 | 13 | 2 | 2 | 9 |
| Normal Butane | 4142 | 184 | 299 | 1925 | 1734 | 3 | 3 | — | — | — | — | — | — | — | — | — |
| Alkylate | 3685 | 3370 | 25 | 190 | 100 | — | — | — | — | — | — | — | — | — | — | — |
| HF | 195 | — | — | — | — | 265 | 105 | 34 | 6 | 12 | — | — | — | — | — | — |

Reasonable variation and modification are possible within the scope of the foregoing disclosure, drawing and appended claims to the invention the essence of which is that there is practiced a two-stage condensation of a fractionation overhead, obtained upon fractionation of an HF-catalyzed alkylation of an isoparaffin with an olefin, as described; the first stage condensation yielding a propane lean in ethane which is used to reflux the fractionation; and vapors which are condensed and which upon separation of acid are passed to a stripping zone, bottoms from which are essentially ethane and propane which are warmed and fractionated to yield a vaporous ethane-propane product and a liquid propane lean in ethane and lean in HF, and said liquid propane is at least cycled to one of said stripping zone and fractionation zone and used as pump flush for at least one of the pumps supplying reflux to said fractionation zone and the pumps supplying feed to said stripping zone and/or at least a portion of said reflux to said fractionation zone and the feed to said stripping zone.

I claim:

1. A process for the alkylation of an isoparaffin with an olefin in the presence of HF catalyst which comprises fractionating in the fractionation zone an alkylation hydrocarbon phase to produce an overhead which contains ethane, propane, and HF, partially condensing said overhead producing (a) a first acid phase which is removed from said process (b) a first liquid hydrocarbon phase containing propane lean in ethane and (c) a vapor stream containing HF, ethane and propane, passing said propane lean in ethane to the fractionation zone as reflux therefor; condensing said vapor stream to form a second acid phase which is removed from said process and a second liquid hydrocarbon phase which is passed to an HF stripping zone to remove HF therefrom, separating from said stripping zone bottoms consisting essentially of ethane and propane, warming said bottoms, fractionating said bottoms into a propane-ethane product and a bottoms propane and passing said bottoms propane to one of said fractionation zone and said HF stripping zone.

2. A process according to claim 1 wherein said reflux is passed to the fractionation zone by a pump and wherein said bottoms propane is used as flush for said pump.

3. A process according to claim 1 wherein said second hydrocarbon phase is passed to the said HF stripping zone by a pump and said bottoms propane is used as a flush for said last mentioned pump.

* * * * *